Nov. 8, 1949   E. A. KRAEMER   2,487,559
DETACHABLE UTENSIL HANDLE
Filed March 21, 1946
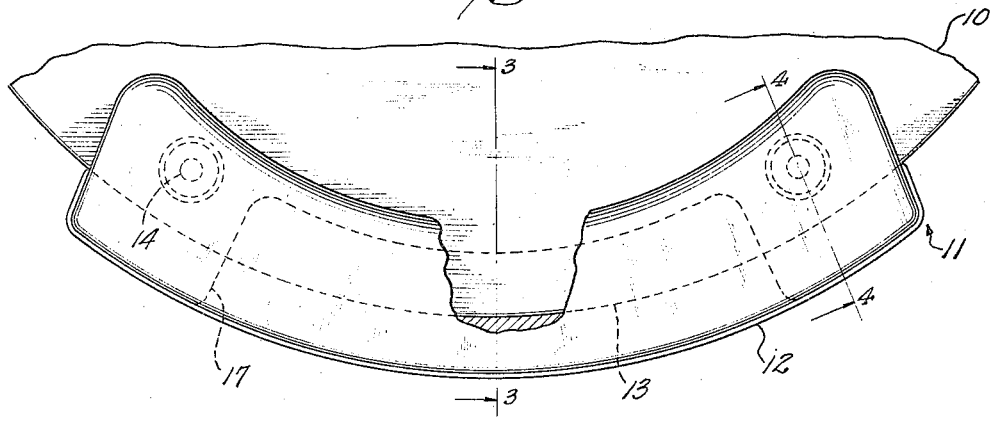
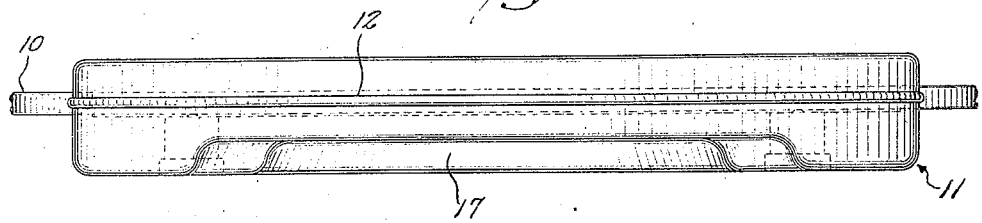
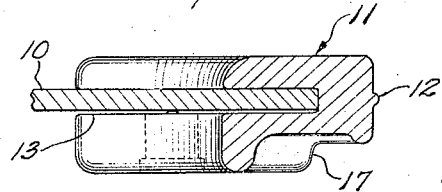  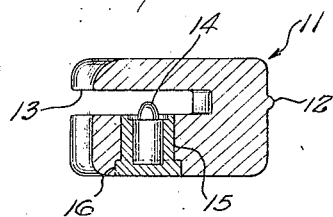
INVENTOR.
ELMORE A. KRAEMER
BY John W. Michael
ATTORNEY.

Patented Nov. 8, 1949

2,487,559

UNITED STATES PATENT OFFICE 2,487,559

DETACHABLE UTENSIL HANDLE

Elmore A. Kraemer, West Bend, Wis., assignor to West Bend Aluminum Co., West Bend, Wis., a corporation of Wisconsin Application March 21, 1946, Serial No. 655,952

2 Claims. (Cl. 16—114)

This invention relates to utensil handles and more particularly to the detachable handles which are frictionally engaged to the utensil.

Certain types of utensils are designed to be used as cooking utensils as well as serving utensils. To use non-metallic low heat conducting handles with such type of utensil they must be removable. However, such handles must be firmly engaged with the utensil when it is being used as a serving dish in order to prevent accidental removal.

It is therefore an object of this invention to provide a detachable utensil handle which is easily attached to the utensil and yet firmly retained thereon when the utensil is used for serving.

Another object of the invention is to provide a removable utensil handle which is simple and attractive in appearance and easily and inexpensively manufactured.

These objects are accomplished by providing the detachable handle with a utensil edge contacting surface which is firmly pressed into engagement with the surface of the utensil edge by a bullet type friction catch. When the handle is on the edge of the utensil, the bullet type friction catch urges said surface against the surface of the utensil to provide a frictional engagement therebetween which prevents the accidental removal of the handle when the utensil is used for serving purposes. In order to secure the bullet type friction catch without marring the appearance of the handle, it is first mounted in a plug made of the same material as the handle and then inserted in the handle.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a top plan view of a detachable utensil handle embodying the present invention, a part being broken away for the sake of illustration;

Figure 2 is a side elevation view of the handle of Figure 1;

Figure 3 is a sectional view taken on the line 3—3 of Figure 1; and

Figure 4 is a sectional view taken on the line 4—4 of Figure 1 but with the handle removed from the utensil.

Referring to the drawings by reference numerals, only the edge 10 of the utensil is shown as some cooking and serving utensils are flat throughout and others are dish-shape with sloping edges. These type utensils are made of material which permits their use as a cooking utensil, and when so used the handles are detached to save space in the oven and prevent undue heating of the handles. The detachable handle 11 may be made of wood, plastic, or some other substitute which acts as an insulator while presenting a pleasing appearance. The handle 11 in the embodiment shown herein is molded from plastic of a commercially known type, the molding line being indicated at 12. In the molding process a longitudinally extending slot 13 is formed inwardly from the inner edge of the handle. The bottom of this slot, as viewed in Figure 1, conforms in shape to the arc of a circle and is substantially parallel to the outer edge of the handle 11. The slot 13, as shown in Figures 3 and 4, must be made sufficiently wide to permit a utensil of usual and average thickness to be positioned between its sides. It has been found that slots as wide as $\frac{3}{16}$ of an inch accommodate most utensils. While the shape of the edge 10 is shown as conforming substantially to the shape of the slot 13, it is not essential that the two shapes be in exact conformity. The slot must merely be deep enough to permit the utensil edge to be gripped by the full depth of the slot at each of its ends and by the bullet catches 14.

The bullet type friction catches 14 are of standard manufacture, such as shown in the hardware catalogues: of Schlatter Hardware Co., as item No. 698, No. 11 or No. 12; of Saginaw Hardware Co., General No. 36, as items X698, X693; and of American Cabinet Hardware Company, as item No. 3672, and need not be further described herein except to state that they comprise a retaining cup from one end of which the bullet-shaped button is resiliently urged to projecting position. The bullet type friction catches 14 are positioned within and adjacent each end of the slot 13 and preferably project from the lower side thereof. Ordinarily bullet type friction catches of this type are inserted into the material from that surface from which they project. This standard method of assembly cannot be utilized when such surface is the inner side of a slot. Therefore the lower side of the slot 13 is provided with counter-bored openings 16 extending from the outside of the handle to the interior of the slot. The catches 14 are first inserted in plugs 15 having a shank and head adapted to fit in said openings. This may be done by either shrinking the bullet type friction catches 14 into apertures extending inwardly from the shank end of the plug or they may be molded into the plug at the time it is molded. The plug 15 together with the bullet type friction catch 14 is then either molded, shrunk or cemented into a respective opening 16.

In order to permit the handles to be used with utensils which are flat throughout and to otherwise facilitate their use, they are provided with finger-receiving recesses 17 in the lower side of the handle.

The handles 11 are customarily used in pairs with each handle of a pair placed on opposite edges of the utensil. They are attached to the utensil by merely pressing them over its edge. The entering edge of the utensil engages the bullet type friction catch 14 and depresses it, causing the catch to ride onto the surface of the edge. The pressure exerted by the catch causes a frictional engagement between one surface of the slot and a surface of the edge which securely holds the handle in position and prevents it from sliding or dropping off particularly when the weight of the utensil and its contents is not supported by the handle. The removal of the handle, which customarily takes place when the utensil is empty, is easily accomplished by withdrawing it parallel to the plane of the utensil edge.

When the handle and the plug are molded from the same composition, there is a sufficient blending between the surface of the head portion 16 and the surface of the handle to practically conceal the presence of the plug in the handle. Thus the appearance of the handle is not marred by the incorporation therein of the friction catch.

Although only one embodiment of the invention is shown and described herein, it will be understood that this application is intended to cover such changes or modifications as come within the spirit of the invention or scope of the following claims.

I claim:

1. In a detachable handle, a pair of spaced portions adapted to straddle the edge of a utensil, an aperture in one of said portions having a counter-bore, a headed plug, and a bullet type friction catch held in said plug with its edge-engaging portion projecting from the shank end of said plug, said plug and catch being secured in said aperture with said head in said counter-bore.

2. In a detachable handle, a pair of spaced portions having surfaces defining a slot adapted to straddle the edge of the utensil, an opening extending from the outside of said handle to one of said surfaces, a plug formed of the same material as said handle and adapted to fit in said opening, and a bullet type friction catch held in said plug, said plug being fixedly secured in said opening with the engaging portion of said catch projecting from said surface.

ELMORE A. KRAEMER.

REFERENCES CITED

The following references are of record in the file of this patent:

UNITED STATES PATENTS

| Number | Name | Date |
| --- | --- | --- |
| 1,575,576 | Guitian | Mar. 2, 1926 |
| 1,965,354 | Patock | July 3, 1934 |
| 2,222,336 | Domellof | Nov. 19, 1940 |